Figure 1:
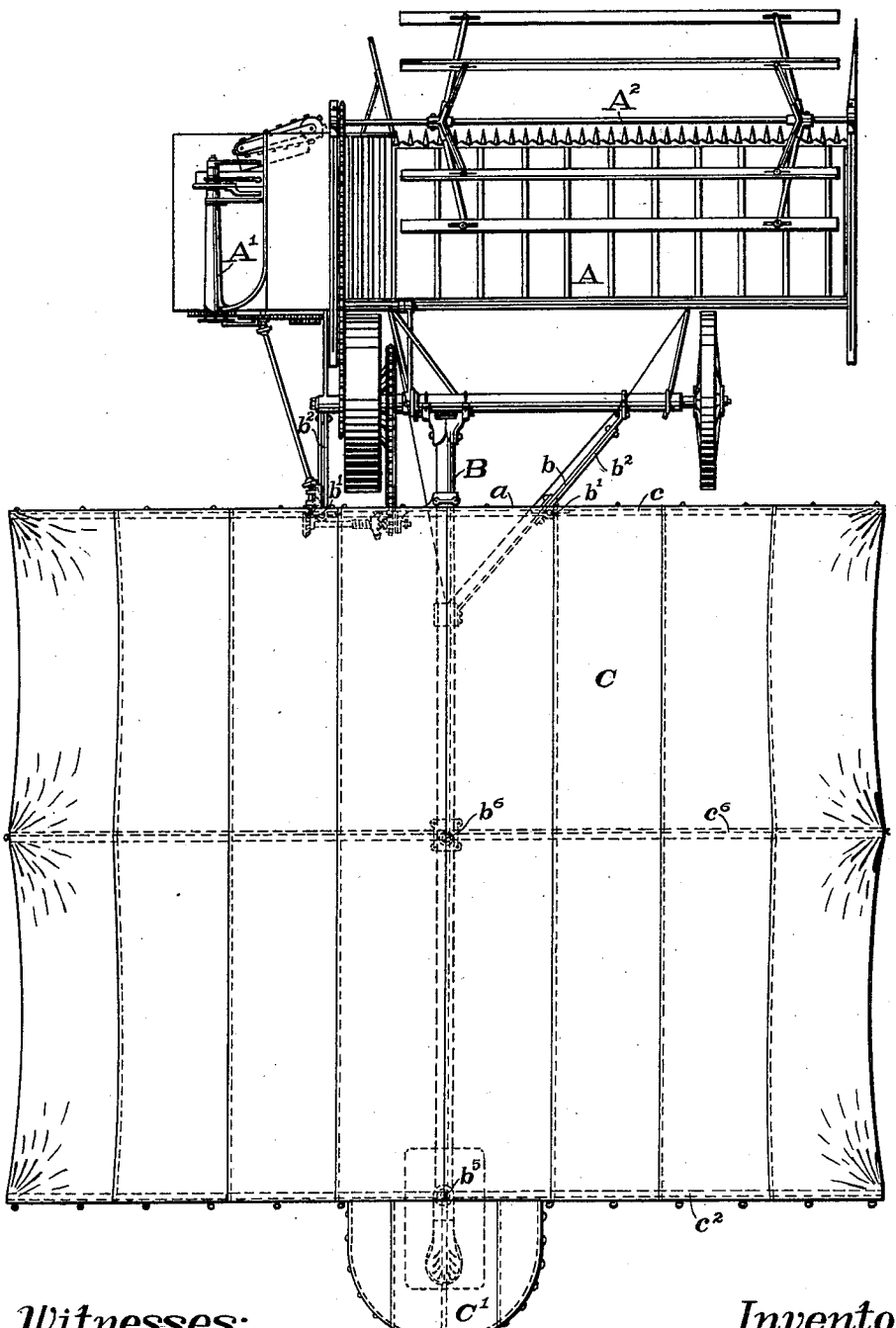

No. 673,593. Patented May 7, 1901.
J. F. APPLEBY.
COVERING FOR HARVESTERS.
(Application filed June 20, 1900.)
(No Model.) 3 Sheets—Sheet 1.

Witnesses:
Inventor:

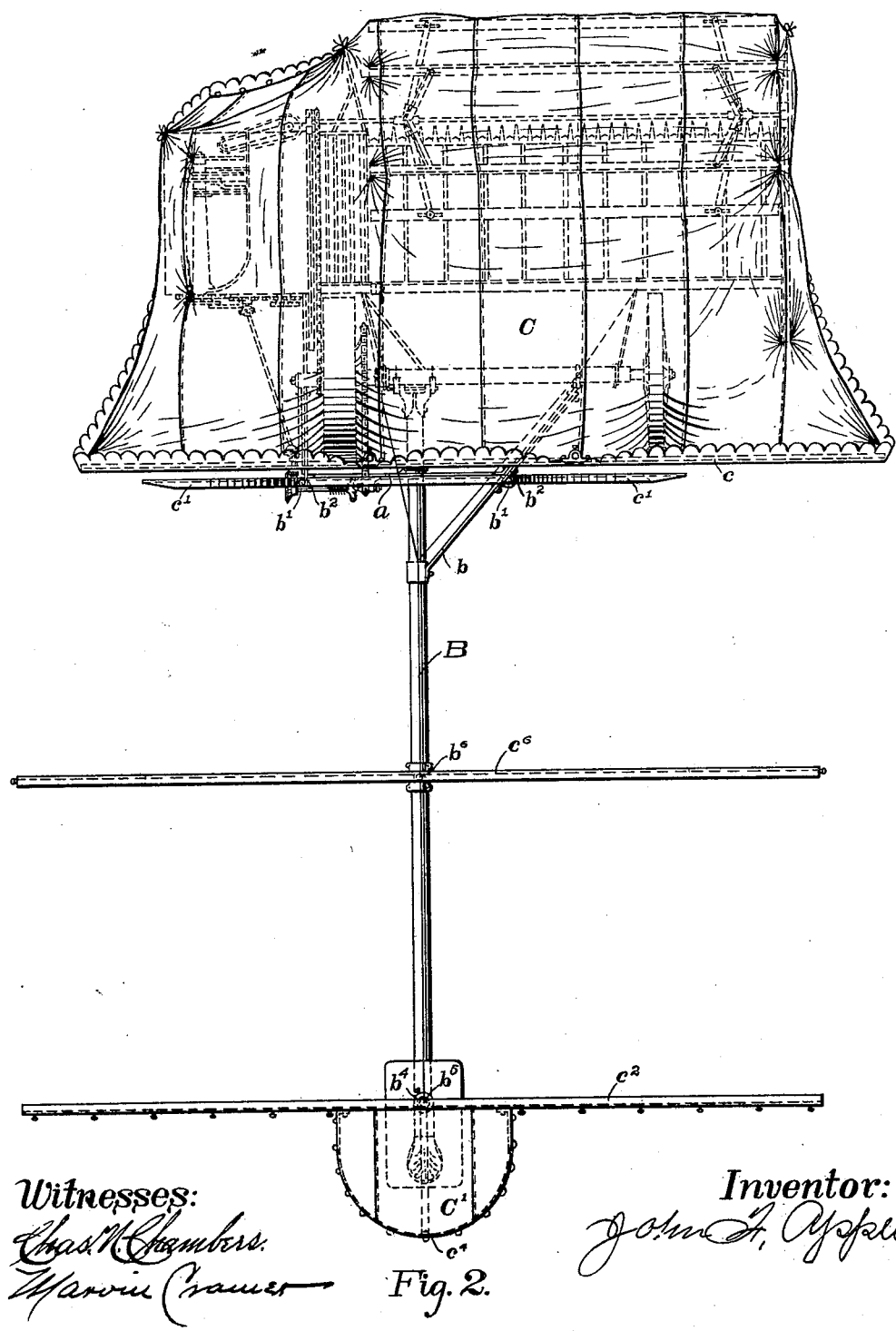

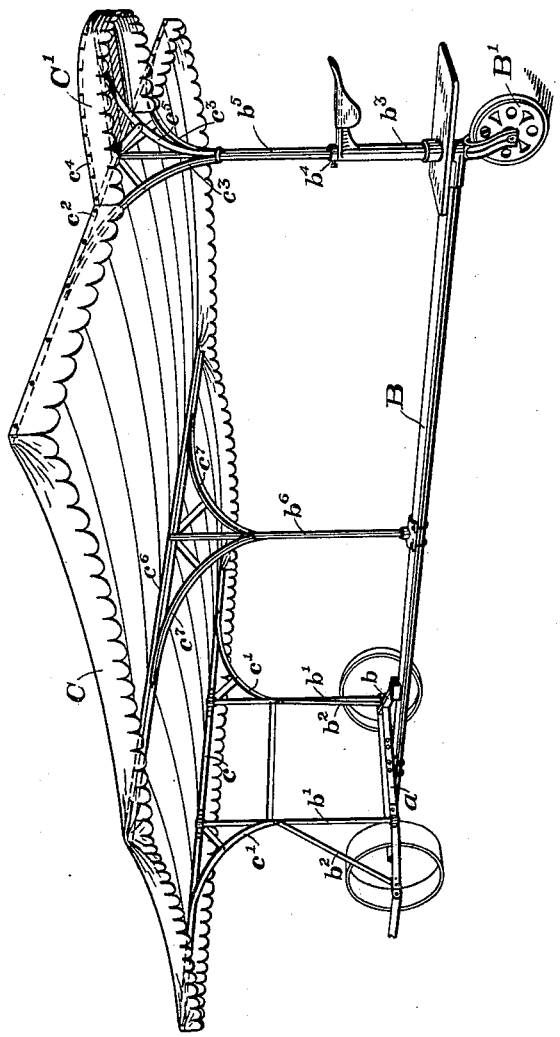

UNITED STATES PATENT OFFICE.

JOHN F. APPLEBY, OF CHICAGO, ILLINOIS, ASSIGNOR TO THE DEERING HARVESTER COMPANY.

COVERING FOR HARVESTERS.

SPECIFICATION forming part of Letters Patent No. 673,593, dated May 7, 1901.

Application filed June 20, 1900. Serial No. 20,988. (No model.)

*To all whom it may concern:*

Be it known that I, JOHN F. APPLEBY, a citizen of the United States, residing at Chicago, in the county of Cook and State of Illinois, have invented certain new and useful Improvements in Coverings for Harvesters; and I do hereby declare the following to be a full, clear, and exact description of the invention, such as will enable others skilled in the art to which it appertains to make and use the same, reference being had to the accompanying drawings, forming a part of this specification, in which similar letters refer to similar parts throughout the several views.

The object of my invention is to provide means by which the animals used to furnish the motive power for harvesting-machines may be protected from the heat of the sun while at work, thus increasing their efficiency, and which when not so used may be transposed, so as to protect the machine itself from the elements.

In the drawings, Figure 1 is a plan view of my invention, showing it applied to a harvester for the protection of the animals. Fig. 2 is a plan view of the same, showing it transposed for the protection of the machine. Fig. 3 is a perspective view of the same, showing as much of a harvester as necessary to show a means for support.

The harvesting-machine here shown is of the push or header type, having a binder attached.

A is the platform, A' the binder, and $A^2$ the reel.

B is the thrust-tongue, and B' the steering-wheel.

C is the transposable covering for the protection of the animals while at work and the machine at any other time, and C' the covering for the protection of the operator.

To the cross-brace $a$, near the corner of the main frame, and to the thrust-tongue brace $b$ at its intersection with the cross-brace $a$ upright supports $b'$ and $b'$ are secured in suitable brackets and are rigidly braced to the main frame and to the thrust-tongue brace by the stay-rods $b^2$ and $b^2$. To the tops of the supports $b'$ and $b'$, which are of a sufficient height to clear the heads of the animals, is detachably secured the cross-piece $c$, which is made rigid with the said supports by braces, as shown at $c'$ and $c'$. Riveted or otherwise firmly fastened to the cross-piece $c$ is the transposable covering C.

Pivoted in the hollow shank $b^3$ of the upright shaft of the steering-wheel and adapted to be adjusted vertically according to the height of the operator by any suitable means, as by a collar and set-screw $b^4$, is the support $b^5$. A cross-piece $c^2$ is secured to the top of the support $b^5$ and rigidly braced thereto by braces $c^3$ and $c^3$. The cross-piece $c^2$ is furnished with suitable means for readily attaching and detaching the transposable covering, such as eyelet-knobs, the covering having eyelets in its rear edge adapted to receive the same.

Secured to the rear of the cross-piece $c^2$ is the frame $c^4$, which is supported by a brace, as shown at $c^5$, and to which the covering C' is riveted or otherwise firmly fastened. The covering C' is preferably detached from the covering C, remaining fixed with respect to the cross-piece $c^2$, but may also be made quite as satisfactorily in one part with it.

In the middle of the covering and substantially in the middle of the thrust-tongue and firmly secured thereto by means of a suitable bracket is the upright support $b^6$ of a height proportionate to the height of the other supports, to the top of which is secured in a like manner the cross-piece $c^6$ and braced as shown at $c^7$ and $c^7$. At the ends of said cross-piece $c^6$ the covering is fastened thereto by eyelets and eyelet-knobs or other suitable means to hold both in proper position.

My invention is used in the following manner: When the machine is to be used, the cross-piece $c$, to which the covering is firmly fastened, being secured to the tops of the upright supports $b'$ and $b'$, the covering is thrown over the cross-piece $c^6$ and fastened to the ends thereof and then drawn back and fastened to the cross-piece $c^2$. When the machine is to be housed for the winter or to be protected over night or during a storm, the operation is reversed. The covering is unfastened from the cross-piece $c^2$, thrown over cross-piece $c^6$, from which it is unfastened, and finally thrown over cross-piece c and the machine and securely fastened to the various parts thereof. The cross-piece c may then be left at the top of the uprights b' and b', or, if it is desired to more completely cover the machine, it may be detached and dropped down upon it.

Having thus described my invention, what I claim as new, and desire to secure by Letters Patent, is—

1. A harvesting-machine, having standards erected on the tongue, cross-pieces projecting laterally from said standards, and an awning carried by said cross-pieces, said awning being permanently secured to the cross-piece nearest the machine, and detachably connected to the others, whereby it may be stretched over the team or reversed and used as a covering for the machine.

2. A harvesting-machine, having awning-supports erected on the tongue, an awning carried by said supports, said awning being permanently attached to the support nearest the machine, and detachably connected to the other supports, whereby it is adapted to be stretched over the team and be reversed and folded over so as to cover the machine, and a supplemental awning carried by the outermost support in position over the driver's seat.

J. F. APPLEBY.

Witnesses:
CHAS. N. CHAMBERS,
MARVIN CRAMER.